(12) United States Patent
Kelsay (10) Patent No.: US 10,375,932 B2
(45) Date of Patent: Aug. 13, 2019

(54) DOG CHEW TOY KIT

(71) Applicant: Hilary Kelsay, Richland, WA (US)

(72) Inventor: Hilary Kelsay, Richland, WA (US)

( * ) Notice: Subject to any disclaimer, the term of this patent is extended or adjusted under 35 U.S.C. 154(b) by 120 days.

(21) Appl. No.: 15/410,748

(22) Filed: Jan. 19, 2017

(65) Prior Publication Data

US 2017/0223930 A1 Aug. 10, 2017

Related U.S. Application Data

(60) Provisional application No. 62/292,302, filed on Feb. 6, 2016.

(51) Int. Cl.
*A01K 15/02* (2006.01)
*A01K 5/00* (2006.01)

(52) U.S. Cl.
CPC .............. *A01K 15/026* (2013.01); *A01K 5/00* (2013.01)

(58) Field of Classification Search
CPC .................. A01K 15/025–026; A01K 5/00
USPC .................................. 119/707–711
See application file for complete search history.

(56) References Cited

U.S. PATENT DOCUMENTS

| | | | | |
|---|---|---|---|---|
| 6,112,703 A * | 9/2000 | Handelsman | ........ | A01K 15/026 119/707 |
| 6,186,096 B1 * | 2/2001 | Miller | .............. | A01K 15/026 119/709 |
| 6,200,616 B1 * | 3/2001 | Axelrod | .............. | A01K 15/026 426/285 |
| 6,623,328 B1 * | 9/2003 | Theel | .............. | A01K 15/026 119/707 |
| 8,701,598 B1 * | 4/2014 | Crabtree | .............. | A01K 15/026 119/709 |
| 2005/0268862 A1 * | 12/2005 | Morrison | .............. | A01K 15/025 119/707 |
| 2006/0000424 A1 * | 1/2006 | Axelrod | .............. | A01K 15/026 119/709 |
| 2006/0134278 A1 * | 6/2006 | Miller | .............. | A01K 15/026 426/132 |
| 2007/0215063 A1 * | 9/2007 | Simpson | .............. | A01K 15/025 119/708 |
| 2008/0314332 A1 * | 12/2008 | Jacobs | .............. | A01K 5/0114 119/709 |
| 2009/0078214 A1 * | 3/2009 | Mann | .............. | A01K 15/026 119/709 |
| 2009/0095231 A1 * | 4/2009 | Axelrod | .............. | A01K 15/026 119/709 |
| 2012/0125267 A1 * | 5/2012 | Kelly | .............. | A01K 15/026 119/710 |
| 2012/0240866 A1 * | 9/2012 | Taylor | .............. | A01K 15/026 119/710 |
| 2013/0152871 A1 * | 6/2013 | Dewey | .............. | A01K 15/026 119/710 |
| 2014/0230752 A1 * | 8/2014 | Yerton | .............. | A01K 15/026 119/709 |

(Continued)

*Primary Examiner* — Christopher R Harmon (57) ABSTRACT

A chew toy for dogs is an assembled kit including a noisemaker and a plush section with a spine that attaches to another more rigid component. The plush section can be removed from the spine to reveal an eyelet. Strands of edible material are laced through the perforations along the perimeter of the rigid component. The varied shape of the toy allows a dog having a mouth of any size or shape to find a site of a complementary shape for enhanced comfort and chewing pleasure.

1 Claim, 5 Drawing Sheets

(56) References Cited

U.S. PATENT DOCUMENTS

2015/0373950 A1\* 12/2015 Spring .................. A23K 40/00
                                                                                       119/710
2017/0020109 A1\* 1/2017 Dewey ................ A01K 15/026

\* cited by examiner

DOG CHEW TOY KIT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

PRIORITY: CROSS-REFERENCE TO THE RELATED APPLICATION

This non-provisional utility patent application claims the benefit of and priority to US Provisional Application 62/292,302 "Dog Chew Toy," filed 6 Feb. 2016, and the entire content of said provisional application is incorporated into this document by reference.

FIELD

The invention relates to chew toys for pets and primarily for dogs. The invention is a pet chew toy kit which is a unique combination comprising consumable and durable components which can be assembled into a unitary toy or deployed as separate objects which offer different stimuli for the dog to select at whim or instinct.

BACKGROUND

Pet chew toy kits are often marketed as sets of related objects, such as a retrieval object and a slinging device, or a set of chewable consumable objects of various flavors, or a set of similar objects graduated by size or harness to be deployed in series as an immature animal develops in size or strength. Other pet chew toy kits come in sets of objects of different shapes, sizes, or flavors to extend the attention of the pet as it can select among different objects offering different mouth feels different kinematic behaviors as they are chewed or flung about during play. One design outside the scope of the invention offers a flexible cage containing smaller chew-able objects which can be released when chewing by a pet distorts the cage to allow the trapped articles to escape.

In this specification "chew toy" or "pet chew toy" may refer to a single object or to one object comprised by a set or kit of objects typically sold together as a group of related objects.

The invention relates to chew toys for pets and primarily for dogs. Dogs enjoy chewing and rough-housing with various objects, and may deleteriously exercise their proclivities upon articles such as furniture, shoes, hats, and gloves or the like, worrying and damaging these to the consternation of their owners. A well-designed chew toy will reduce or eliminate unwanted chewing by offering itself as the most attractive item for chewing from among the available objects in its immediate environs.

Common chew toys come in a variety of shapes; most are unitary bodies of a homogeneous material such as ductile plastic or rubber, others are materials such as rope or rawhide knotted at the ends to resemble the condyles of an animal bone. Many chew toys resemble actual bone shapes or stylized bone shapes.

Some materials are impregnated with scent-emitting compounds or tasty compounds to attract the dog and extend its chewing sessions. Other retain the attention of the dog by emitting noises or by moving in ways unexpected by the dog, or entertaining to the dog. Longer chewing sessions with the chew toy extend the duration of time in which other items more precious to its owner are not the target of interest for chewing.

Some chew toys are made of materials which get consumed over time, such as by the effect of dog saliva soaking into and softening them material so that it can be broken in a piecewise manner until consumed entirely. Other designs offer a more durable primary structure, with pockets which hold portions of secondary edible items which may be replaced when consumed, and other designs offer embedded secondary edible items which become exposed for consumption only at the rate that the surrounding primary structure is also consumed.

Dog breeds vary widely in body shapes and size, and the dimensions and contours of mouthparts such as jaw length, widths, radii, location of teeth, and the overall configuration of the snout also vary greatly. Thus there are many toys which are accessible to only the subset of dogs which can grasp them effectively given the shape and size of the snout. For example, a tennis ball cannot be effectively grasped by a dog with a small mouth or a short snout, and short-legged dogs have trouble transporting and playing with a large diameter disc toy such as a Frisbee®. It would therefore be useful to supply a dog chew toy accessible to the widest span of dogs by means of a toy offering zones of various thicknesses so that any dog with any sort of can find at last some portion on the toy available for chewing that comports with the given size, width, and length of its mouth.

Many dogs instinctually enjoy retrieving thrown objects and enjoy tracking, stalking and intercepting various moving objects. It is desirable to provide a tie point for a string or cord so that the toy can be dangled, tugged about, or flung far afield. Dogs also instinctually enjoy contending for possession by "playing tug-of-war" with an object tied on a length of rope.

It is also desirable that the toy can capture the dog's attention for long periods of time, and a strategy to do this is for the toy to offer more than one mode of entertaining chewing experience for the dog, such as having portions of the toy made of different hardnesses, strengths, or toughnesses, or other mouth-feels, so that the palate experience is varied as the dog explores and enjoys different parts of the toy.

Yet another method of capturing the dog's attention is having the toy emit noises or sounds. It is preferable that sound emissions be powered from mechanical energies of the chewing, although other devices use stored energy such as batteries, which disadvantageously mush be replaced.

Toys lacking edible portions are outside the scope of the invention. Also outside the scope of the invention are toys formed to resemble sticks or which are thrown for retrieval games, flying disc toys and boomerang toys which are thrown for retrieval games.

It is also desirable that worn or consumed portions of the toy can be replaced as needed to restore or maintain the toy's full and best effects.

BRIEF SUMMARY

The invention is a pet chew toy primarily for dogs, comprising a unique combination or kit offering consumable and durable components which can be assembled into a unitary toy or deployed in separate parts which offer different stimuli for the dog to select at whim or instinct. This chew toy kit includes a plush section with an embedded noisemaker and both durable and edible consumable components. The components of the toy can be deployed as a unitary assembly or deployed separately to afford an area-effect amusement.

The continuing area for improvement of chew toys for dogs is to devise toys with effective modes of capturing the attention of the dog for the longest possible time, and to extend the service life of the toy in its harsh environment of impacts, cycles of mechanical stresses and deformations, especially crushing, outdoor conditions of all seasons, while remaining proof against dog saliva and other moistures and liquids found inside and outside the home such as water, chlorinated or brominated water from swimming pools, cleaners, bleaches, solvents, and cosmetics.

Thus the invention offers several advantages over the current state of the art. A first objective is to offer a highly attractive chewable object capable of occupying a pet's attention and propensities for chewing, such that this object sustains physical forces, salivary actions, and physical wear in preference to these depredations being directed to other household objects and possessions.

Another objective of the invention is to maintain the attention of the pet for long periods of time, and one method of doing this is to offer several varied modes of entertainment which the pet may alternately elect and enjoy.

Another objective of the invention is to reduce destruction of other household possessions by supplying a chew toy which engages a dog's propensity for chewing in preference over other household objects that an owner prefers not to be chewed upon by the dog.

Dogs have a profound instinct to destroy objects by chewing, and so another objective of the invention is to offer a chew toy with replaceable and consumable parts that can provide a safe outlet for these destructive tendencies.

Another objective of the invention is to offer areas of a varied thickness and edge profiles along its perimeter so that for a wide variety mouth shapes over the various breeds of dogs, the dog can explore and discover the most ergonomic purchase points to enjoy chewing the toy or to pick it up comfortably in its mouth for transport from one play area to another.

Another objective of the invention is to provide a single toy or kit offering a wide variety of stimuli, from taste sensations, areas of firm textures and palatableness, and areas of soft textures and palatableness, and various chewing sensations, and also offering certain durable sections and other replaceable consumable sections. For the consumable sections, a further objective of the invention is to provide replaceable components which can be supplied in different flavors to offer taste variety to the dog.

Another objective of the invention is to offer means by which a dog owner of modest strength can throw the toy further than an equivalent lumped mass, such as by tying a length of cord to an eyelet so the toy can be slung in an arc and released like a sling to develop a higher speed than an arm's throw, thus landing farther than otherwise, and giving the dog greater running distances and more exercise in a retrieval game. Thus this objective of the invention is to act as a sling so that the toy can flung with relative ease as a sling object to a great distance as a retrieval object for the dog.

A corollary to this objective of the invention is to provide an attachment point on a component of the toy where may be affixed or attached common or readily available household objects of an inexpensive, disposable, expendable or consumable nature, so that in attracting the dog's chewing desires, other household possessions may be ignored and preserved. A further objective in this regard is that animal may associate chewing and play with the elements of the toy kit and with these common, inexpensive, and disposable objects as familiar and chewable things even when found separate from the chew toy kit parts, so that when the owner deploys additional numbers of these common, inexpensive, and disposable objects the animal may immediately engage and worry upon these objects in favor of furniture and other household possessions.

Another corollary objective of the invention is to provide an attachment point for a cord so that the toy can be drawn, or sporadically or randomly tugged in view of the dog, so as to arouse its predatory instincts to track and intercept prey animals, and capture and direct these instincts into harmless and enjoyable playtime in communion with the dog owner.

It has been observed that the user (the dog) becomes amused by simultaneous taste stimuli and aural stimuli to a greater extent than the effects of tasting and eating alone, or the aural stimulus alone, and it is also possible that the user may be amused by simultaneously combined stimuli to a greater extent than by the sum of the individual effects.

When these three available activities are made available by a single unitary toy or toy kit, the pet can be entertained for a longer total time, because even if tis interest becomes saturated by any two, a third activity is available during which abstention from the two non-elected activities is likely to refresh its interest in a non-elected activity. Thus the total effect of the three available activities combined in one toy kit greatly extends the total duration of a use session over that of any mere dual-mode or single-mode chew toy.

Furthermore, these components of the toy kit can also be attractive to the dog when they are separated into two or more sets of objects and deployed separately within a play area so that the dog can choose any one or another. In this separated mode, an additional configuration is available in that other household items may be attached to either component at their attachment site otherwise used to attach the components to each other.

Another objective of the invention is to offer these various modes all in a single, unitary device, so that the owner need only deploy the inventive device, rather than having to buy and deploy a larger number of single function or dual-function devices. The parts of this one pet chew toy kit can create an entertainment space for a dog which can capture its attention for long times. Anecdotally, a dog that plays regularly develops and maintains a more pleasant and active demeanor and can be a more pleasant adjunct member to a family of owners.

Another objective of the invention is to stimulate and mechanically clean the mouthparts of an animal during a chewing session.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF THE INVENTION AND CERTAIN EMBODIMENTS THEREOF

This invention is a pet chew toy as an assembled kit of three elements or components which can be used as a unitary assembly of components, or the pieces can be separated and deployed in a play are as an area effect stimulus system.

According to the invention, strands of edible and tasty materials are laced through the series of perforations, leaving the edible strands exposed to tasting so that between chewing on either components, enjoying the noises correlated to its chewing motions, and tasting and eating of the strands, a dog can spend many hours of attention alternating between these three entertainment modes offered by this single device. The invention offers taste elements and eating pleasures, a pleasure of masticating a plush volume of material, and a pleasure of masticating a different material, and aural stimuli when a noisemaker is operated by the intermittent squishing or crushing displacements of chewing action. It is now seen that chew toys or chew toy kits only offering one or two entertainment modes are outside the scope of the invention, such as those merely comprising a length of rope or rawhide knotted at its ends to resemble the condyles of an animal bone.

While various aspects and features of certain embodiments have been briefly or topically summarized above, the following detailed description illustrates a number of exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Furthermore, for the scope of this specification, words such as "select," "choose," "decide," or "elect" and their derivative grammatical forms are used to describe the behavior and actions of an animal. Although the response of an animal to available objects or stimuli can vary, this specification does not seek to explain, predict, or justify any possible action by an animal in favor of any other, and does not assert or discern whether or not an animal behaves as a seat of morally responsible agency in taking one or more actions rather than other available actions, or in delaying action, or by inaction.

Similarly, with words such as "enjoy," "expect," "pleasure," "entertain," "amuse," or "fun," when ascribed to animals this specification merely seeks to describe recognizable animal behaviors in various excited states, which although familiar to pet and animal owners as approximations or allegories to human experiences or emotions as connoted or formally denoted by these terms, are not intended to assert that human emotions or mental states exist or operate within animals.

"Worry" in this specification refers not to a negative emotional state, but rather the definition of an animal's act of seizing a play object in its maw and chewing, mangling, shaking, or parading about with the object as harmless, entertaining, and beneficial play.

This specification remains silent and should not be construed as asserting or discerning whether or not legally significant mental states such as culpability or duty exist within animals.

Edible and chewable products used in this invention are derived from various animals and their various tissues. Where this specification mentions edible products derived from animals, the edible meat, organ or tissue name is synonymous and equivalent to the animal name. Therefor "pig" is the same as "pork," and "lamb," "mutton," and "sheep" are equivalents, as are "cow," "steer," and "beef," and also "chicken" is equivalent to "poultry." As a general pattern, the French or Norman French cognate of the English word for the animal has become the English word for the food, and in this specification these associated words are used as equivalents.

Also in this specification the word 'user' refers to the dog or other animal which takes to chewing, eating, squishing or mouthing the invention about in its mouth.

The invention is a kit as an assembly of components which offer three modes of entertainment or attention capture for the dog: a first component has a plush section and noisemaker, and a second component is made of a different material than the plush section and has an attachment site with features which interoperate with the attachment means of the first component. The second component is made of a material dogs find especially enjoyable to chew, which makes this toy more attractive to dogs than toys made of more pedestrian materials. One of the best materials for the second component is a thermoplastic elastomer which can be produced in various hardnesses which enhance the pleasurable aspects of chewing which come from indenting the material and also from skiving chips or strands of a component material which can remain attached in a fuzzy mass. Continuing to chew the toy in this frizzy condition can stimulate the gums of the animal and remove tartar from its teeth, providing a health benefit while further enhancing chewing pleasure. Chewing strands of rawhide has also been observed to clean and improve teeth and remove tartar in this manner.

Figure 1A:
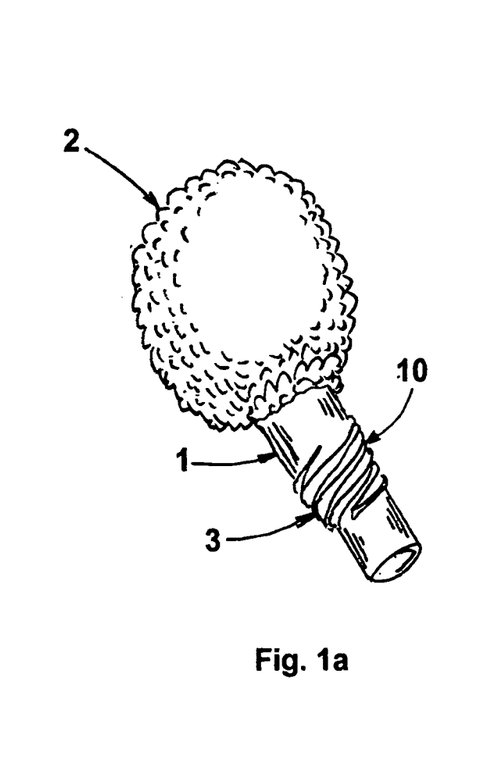
FIG. 1a shows a first component of the invention, with a spine member covered by a plush material.
Figure 1B:
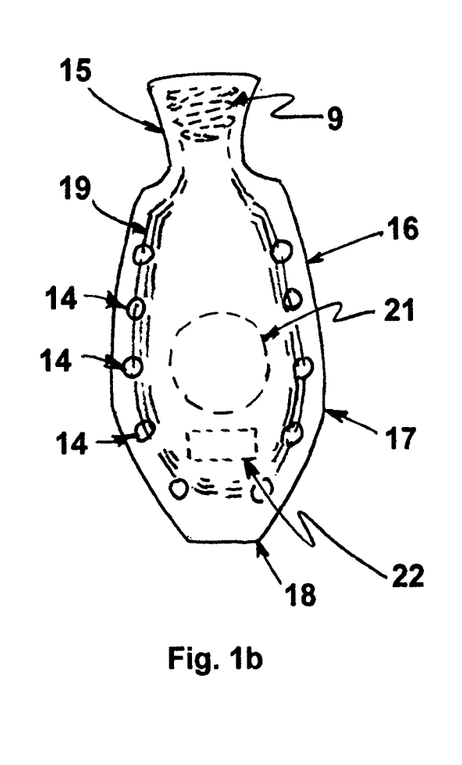
FIG. 1b shows a second component of the invention.
Figure 1C:
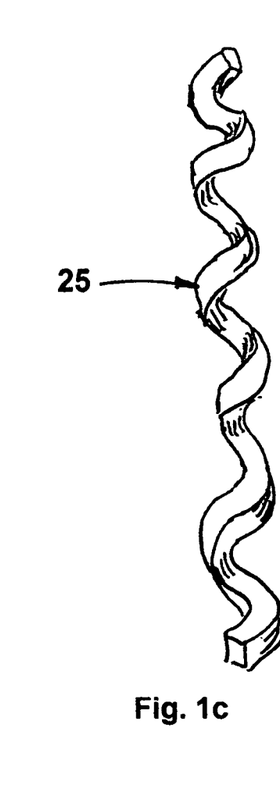
FIG. 1c shows a strand of edible material used as a kit part of the invention.
Figure 3:
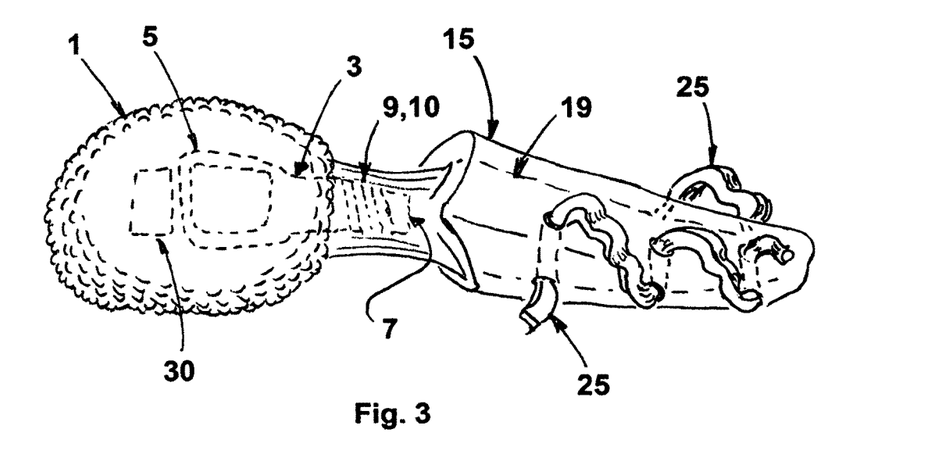
FIG. 3 shows an embodiment of the kit components connected together.

Thus in reference to the figures, FIGS. 1a, 1b, and 1c show separated parts of complete kit. FIG. 3 shows these parts assembled together. The figures will now be described in individual details.

In FIG. 1a, a first component [1] has a fabric or plush material portion [2] which in one embodiment resembles a pom-pom. It is affixed around at least a portion of a spine [3,] also called a spine member, which has two ends with different features on them which will be described in more detail below. One feature or set of features comprises attachment means to connect this first component to a second component described below. In the embodiment shown, the attachment means are male threads [10.]

In FIG. 1b is shown that the second component [15] has a perimeter and a perimeter edge [16] with variable radii varying along the perimeter. A gentle radius is shown at the reference numeral [16] and a sharper radius of the perimeter is shown at reference numeral [17.] Even sharper contours such as corners [18] may be included in or along the perimeter. The second component also has a plurality of apertures [14] passing through the second component along a portion of the perimeter. The second component is hollow with an interior cavity [19.] The cavity communicates with an orifice which includes a receiving site [9] with receiving features complementary to the attachment means of the spine. In the embodiment shown, the receiving site offers female threads to engage with male threads on the spine.

Reference numeral [21] shows a location for a molded-in graphic logo so that a brand or mark can be easily seen and identified. Reference numeral [22] shows a location for indicia such as a trade phrase, product name, slogan, or other text information. Logos, indicia, texts, and the like may be relieved from the surface or impressed, or both.

FIG. 1c shows a third component which is a strand of edible material [25.] Such strands may be furnished in any shape including for example, bulk coil or a spiral from which portions can be unwound and threaded into apertures [14] of the second component shown in FIG. 1b. In one preferred embodiment, the curing process for the edible material strands naturally imparts a helical shape as shown in FIG. 1c, which advantageously suggests lacing or winding as an install method through one or more apertures.

Hardness of plastic materials is usually measured on any of the several "Shore durometer" scales derived from those originally defined by Albert Ferdinand Shore in the 1920s. Operable embodiments of the invention reside within a Shore durometer of 25A and Shore durometer 95A, with the best mode around 50A, and other operable embodiments exist and are contemplated within Shore 0D and 80D.

Figure 2:
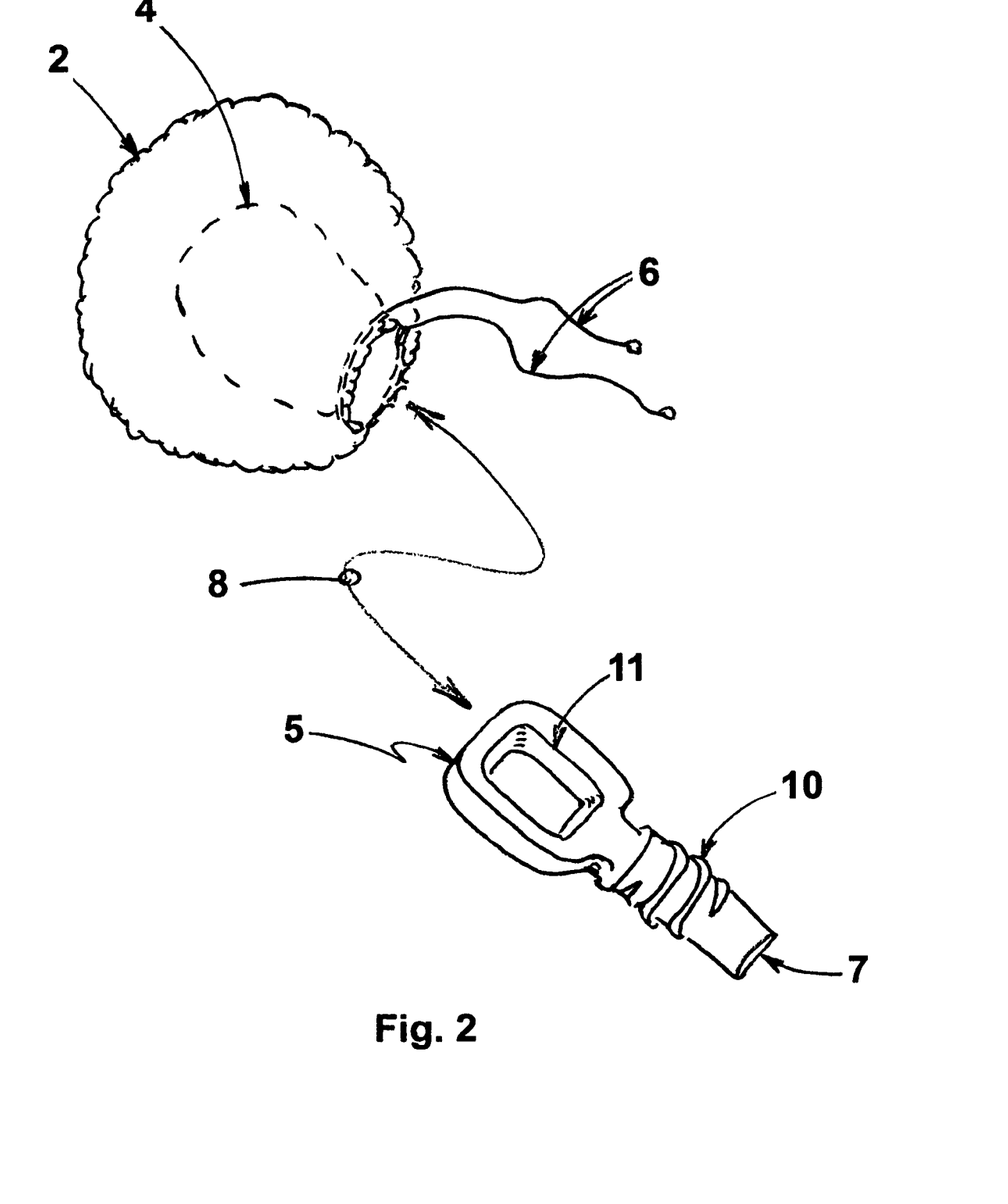
FIG. 2 shows a first component of the invention with a plush material component to be affixed to it.

FIG. 2 shows an embodiment of the first component where the plush material component [2] is formed with a pocket or a sac [4,] so that a first end [5] of the spine can fit into the pocket and the plush portion affixed to it, such as by a draw string or tie strands [6] which can be used to secure the plush component firmly to the spine. Although "tie strands" is a plural noun, they are usually a pair of ends of a single string or cord component which is installed within a fabric tube sewn into perimeter of the pocket so that the circumference and diameter of the opening of the pocket can be constricted and tied off in a constricted state so as to retain the first end of the spine which is larger than the constricted opening.

In this figure the first end of the spine has an eyelet which in this embodiment shown is a substantially square eyelet [11] with rounded interior corners for reduction of stresses known to occur at sharply squared-off corners.

The second end [7] of the pine remains exposed from the plush component and as attachment means for attaching to a second component to be described below. In one embodiment these attachment means are a rod having male threads [10] which mate with complementary female threads in a receiving site such as a recess in the second component.

The act of inserting the first end of the spine into the pocket of the plush material component is depicted by the double-headed sigmoid arrow [8.]

The complete invention comprises three components as shown together in FIG. 3. The first component [1] has a plush section and a spine [3] that attaches to the second component. Although many shapes are contemplated within the scope of the invention, in this figure the plush material component takes on a bulbous shape like a pom-pom. The spine has an end with an eyelet [5] and another end [7] with means to attach to the second component. The plush section has a pouch which engulfs the eyelet end of the spine. The pouch may include tie strands (not shown in FIG. 3) affixed to it so that it can be secured to the spine. A pouch that gets worn through normal use can be replaced with a new one.

Because the plush component is usually made of fabric or a membrane material, the internal volume of the plush section is typically much greater than the external contours of the spine. Stuffing material is therefore required to fluff out the plush section into a desired shape and impart a crushable firmness which invites chewing. As the plush component becomes worn it will eventually allow stuffing bits to escape and these may be eaten by the dog. Therefore the material must be harmless to ingest. Although toys commonly use polymer fluff filling called polyfill, the invention uses shredded cardboard available from recycling companies as an ideal, environmentally prudent, safe and low-cost material. More important as will be discussed further below, bits of shredded cardboard offer greater structural resistance to collapse and require the dog to exercise harder at clamping and crushing.

In this embodiment a noisemaker [30] is also incorporated into the fabric pouch. Typical noisemakers are readily available from various suppliers an can be purchased and installed as a manufacturing step in making the invention. Exact details are at the discretion of the manufacturer of the invention, but a typical noisemaker will include a bladder containing an air reservoir, or be designed to act as a stopper occluding a cavity within the first component. In this embodiment the noisemaker is comprised of the first component as a hollow body, plus a whistle which is the orifice through which air can exit when the hollow body is made to collapse. When a dog chews the first component and encounters the noisemaker, the chewing motion collapses the bladder or air reservoir, and air is forced therefrom to pass through the noisemaker, which then sounds as a whistle or a squeak or any other kind of tone or noise. The dog can immediately correlate a chomp motion with the emitted noise and it has been observed that once this correlation is made, the dog becomes more excited and engaged with the toy than ever. The cardboard bits mentioned above which offer greater resistance to crushing, further require the dog to to exercise harder at clamping and crushing in order to receive the emitted noise as a reward stimulus.

The second component [15] is made of a different material than the plush section and has a receiving site [9] with features which interoperate with the attachment means [10] of the first component. In this figure the receiving site and the attachment means are shown as coupled and so the reference numerals are coincident. The second component has a hollow cavity [19] which allows the entire body to be crushed or collapsed by chewing. The variable thickness and variable radii of the hollow second component allows any size or breed of dog to explore and discover locations where chewing is most comfortable, given the particular shape and size of its mouth. The variable geometry of this second component is designed to offer comfortable and pleasant chewing for any and all dogs. The inventor has exhaustively studied the anatomy and structure of a wide range of dog breeds in order to arrive at the ideal sizes and shapes of the components of this kit.

FIG. 3 also shows the third component of the invention comprising strands of edible material [25,] such as animal by-products, especially hide strips, sinew, or flesh prepared or processed to resist putrification, such as salted, dried meat or jerky. The processing may include seasonings, and flavoring or fragrant ingredients to increase its allure for the user. In a preferred embodiment, these strands are made from bison or buffalo, and can be made from rawhide or intestine of these animals. Suitable edible or chewable products for use with the invention may also be made from other meats and tissues from a variety of animals, so that hides, muscle tissues, sinew, tendon, weasand (esophagus) and also organ tissues and products derived from heart, lung, liver, spleen, and kidneys of edible animals, including beef, lamb, mutton, pork, boar, horse, chicken, turkey, deer, and elk.

Although in the figure the strands are depicted as progressively laced through a series of apertures, the strands of edible material may be looped, knotted, or laced in any manner. Most of the length of the edible material remains exposed. A user munching down on the bladder section of the second component will encounter, and thus smell and taste, these strands of material. The oral stimulation and mouth feel of the edible material presented in strand format is as distinct from other edible portions as (for a human) the tugging and chewing experience of eating jerky is distinct from kebab or yaki-niku morsels.

The invention includes both durable and consumable components. Besides various flavors and compositions for the more readily consumable laced-on strands, the tied-on plush material component will degrade over time and chewing use, and replacements of various sizes, shapes and colors are to be made available as follow-on sales.

Figure 4:
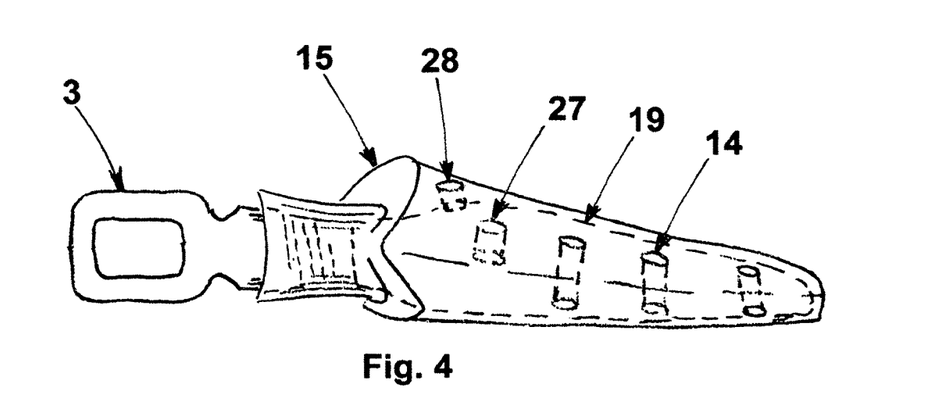
FIG. 4 shows a spine member coupled to a second component of the invention.

The parts of the toy kit may be deployed as an assembled unit or as a set of separated parts with the first component decoupled from the second component, or either of these may be deployed alone. The second component is a body which may be deployed with or without the third component of edible materials being present. FIG. 4 shows the spine [3] of the first component coupled to the second component [15] as a unitary toy without the plush material or the edible strands present. In this mode a string can be attached to the eyelet of the spine and the conjoined components can be slung on the string and the string released so that the toy can be launched great distances at little effort. The dog will engage the toy as a retrieval object in a game of throw and fetch familiar to any dog owners of breeds having innate instincts or proclivities for retrieving thrown objects.

When the second component is deployed separate from the first component, its attachment means, even though complementary to attachment features of the first component, may also receive or attach to other objects having similar complementary features. Thus other attractive objects may be coupled to the second component, especially low-cost disposable items already at hand. The set of attachable items is nearly limitless, allowing an owner to create a similarly limitless series of configurations of the toy for the dog to explore and chew.

FIG. 4 also shows an embodiment in which some of the apertures [14] are through-holes for lacing strands of material and at least one other aperture is a blind aperture [27] not passing entirely through the second component. These blind apertures or blind holes can be used to retain edible materials which are usually furnished as rods or cylinders, such as if one were to cut up a Slim Jim® meat snack for humans and plug the hole with this or other pellets of food produced for pets and of such a similar diameter and shape as the blind aperture so as to be retained therein. Other pasty pet foods or human food such as peanut butter can be plugged into the blind aperture. These plugs of food, being difficult to remove and consume while also offering a surface available for tasting make the toy an especially tantalizing object for chewing and greatly extend the duration of a dog's attention focused on the toy.

The second component [15] includes an internal cavity [19] and can also be referred to as a bladder. The body of the second component is soft, deformable, and a durable material with regard to chewing. Further studying FIG. 4, although some apertures [14, 27] are either blind apertures or apertures which pass through the body of the second component without communicating with the bladder, at least one embodiment also exists within the scope of the invention wherein at least one aperture [28] is a vent which does communicate with the interior cavity or bladder. This vent or plurality of vents allow new methods of deploying the using the toy. In one method, one or more aromatic morsels of food, pet food, pumpkin, or pasty foods such as peanut butter can be inserted into the bladder and then stoppered within by installing the spine member, with or without its plush component. The trapped food emits aromas through the vents [19] but the dog cannot actually eat them. This tantalizing situation causes the dog to explore the toy for some kind of access to the aromatic food, and as long as this access is denied, the dog can remain fascinated by the toy kit and engaged with it. Another similar method of use is to freeze delicious liquids such as broth within the bladder or inner cavity, and then deploy the toy kit or the bladder or inner cavity, and then deploy the toy kit or the bladder component of this kit outdoors. The frozen core of liquid food will melt slowly and exit through the vent holes. The dog will find this toy a tasty treat and in summer months or hot climates the coldness of the bladder component will be especially attractive and enjoyable to the dog.

A yet further aromatic use involves taking a piece of cardboard stuffing and applying essential oils on it, for example lavender, and then enclosing it in the bladder of the toy, with the threaded spine screwed in. The lavender aroma is beneficial for dogs that struggle with anxiety as it allows them to mouth and chew while receiving the calming effects of lavender. There are many essential oils that are safe and effective on pets and that can provide therapeutic effects.

Figure 5:
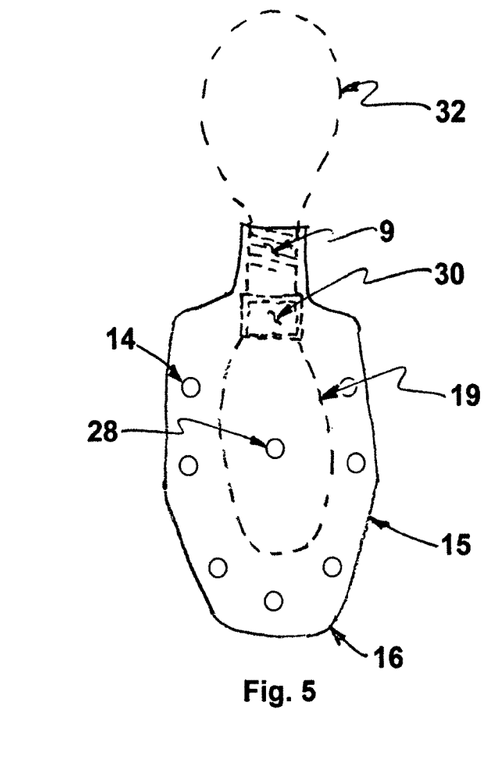
FIG. 5 shows some details of the second component of the invention.

FIG. 5 shows the second component [15] as a body with a perimeter and a perimeter edge [16,] variable radii along its perimeter, apertures [14] for strands of edible material (omitted in this figure) and having an internal cavity [19] meaning that his second component is hollow. The cavity has an aperture which is a receiving site [9] further including female threads. An additional embodiment further includes at least one vent [28] communicating with the bladder or internal cavity [19] so that when a disposable plastic beverage bottle or the like is engaged in the female threads a continuous passageway of air is established between the interior of the beverage bottle, through the noisemaker and the bladder, and then vented to the atmosphere. When the dog chews on and collapses the bottle, air is forced through the noisemaker causing it to sound. The sound stimulus excites the dog and reinforces extended chewing. Some beverage bottles are made of polyethylene and these often make sharp, loud sounds when crumpled, even further stimulating the dog.

Although many attachment modes and mechanisms are contemplated within the scope of the invention, including mechanical threads, superior embodiments include an orifice or aperture in the second component having female threads therein. This kind of embodiment can accept many readily available household objects and provide additional modes of use for the toy. For example, a garden hose thread can accept a length of used, unserviceable garden hose having succumbed to perforation or laceration in its own wear life, and thus be recycled and re-purposed as a chewable member attached to the second component. The length of hose may also extend as a lever arm like the length of cord, and increasing the throwing distance for a human of limited means. A broom handle thread or utility handle thread would allow a human to fashion a rod from a length of broken broom, mop, or garden tool handle, again increasing the throwable range of the toy. Also, such a rod may not necessarily be threadably engaged to the toy; even when only slideably inserted into the orifice, the rod can provide leverage to catapult the toy far afield for retrieval by the dog.

A best embodiment provides the second component offering a popular standard thread promulgated by the International Society of Beverage Technologists named 28/400 in this specification but also written 28-400. This thread is commonly found on beverage containers such as plastic bottles for soda drinks in 8, 12, 16, and 24 ounce sizes, but it is also readily found in numerous cosmetic bottles such as shampoo and lotion containers. Beverage bottles of thin plastic material provide an especially attractive mouth-feel for chewing and when crushed they make a lot of noise especially pleasurable to the dog. Attracting the dog to chew upon disposable articles preserves other more valuable household possessions from the dog's attentions and depredations. FIG. 5 shows such a disposable plastic beverage bottle [32] in dashed-line screwed into the second component [15] of the toy kit.

In addition to the naturally acute noises made when a dog chews a plastic disposable bottle, FIG. 5 further illustrates that it is contemplated within the scope of the invention that a noisemaker [30] may also be installed in the second component so that air can be forced through the noisemaker by chewing and crushing the bottle. The additional noise added to the loud crumpling of a beverage bottle further stimulates and excites the dog. It is also understood in FIG. 5 that chewing and crushing the second component [15] will also force air from the inner cavity [19] through the noisemaker and also cause the noisemaker to sound, with the effect of maintaining or elevating the dog's interest in chewing this part of the toy invention. FIG. 5 also shows the apertures [14] for the strands of edible material (not shown.)

Thread profiles conforming to many thread standards found in industry are also contemplated within the scope of the invention, and these include thread profiles conforming to standards such as ANSI (American standard) screw threads, ISO (metric) thread profiles, garden hose threads, and broom handle threads. Garden hose threads are usually ¾ inch pitch diameter and 11 ½ threads per inch (TPI,) and broom handle threads are usually ¾ inch pitch diameter and 5 threads per inch (TPI.) Pitch diameters may be nominal or dimensional values, and female thread is also called internal thread. Pipe thread (NPT) is also contemplated within the scope of the invention. Additional embodiments may include more than one threaded aperture so as to accommodate more than one household object to be attached to it.

Additional embodiments exist within the scope of the invention, including strands of chewable, degradable materials which are not exactly edible but which may degrade into softened bits which may be broken off over time until consumed. One example material is rawhide.

Also, the plush section of the first component may be formed by a fabric bag, sac, or arbitrary shape stuffed with batting, stuffing, or foam. Shredded cardboard and especially shredded, recycled cardboard has been mentioned previously as a preferable material. The plush section can also include a nodule of a foam or other compressible material, or may be a spun material such as a polymer wound onto the firm center to resemble a wad of cotton candy, or the firm center may exude bristles of soft material strips or extrusions. Also, depending on the materials chosen, the plush section and the spine may be coupled by an interference fit, or an elastomeric plush section force fitted over the spine. The spine may include ribs or barbs or other interfering features which increase the grip strength of the plush section onto the spine for increases endurance in rough play.

Figure 6A:
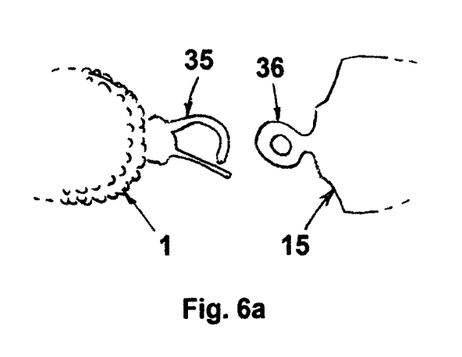
FIGS. 6a and 6b show attachment means for coupling a first component to a second component of the invention.

The means for attachment of the spine to the second component may comprise the spine having threads and the second component having a thread receiving orifice as a receiving site, or the spine may attach to the second component by other attachment means. FIG. 6a shows part of the first component [1] having a snap-hook [35] as an attachment which can snap onto an eyelet [36] as a receiving site to connect to the second component [15] in an articulated mode (i.e., a partially unconstrained mechanical coupling) so that if the dog grabs one component in its mouth to chew on it or carry it about, the other component tends to flop about or move randomly which provides additional play stimulus to the dog as compared to a rigid toy. It is also contemplated within the scope of the invention that the first component has an eyelet and the second component has a complementary snap-hook, and further, that both components may have eyelets and be tied together with a length of rope, cord, line, or other flexible link.

Figure 6B:
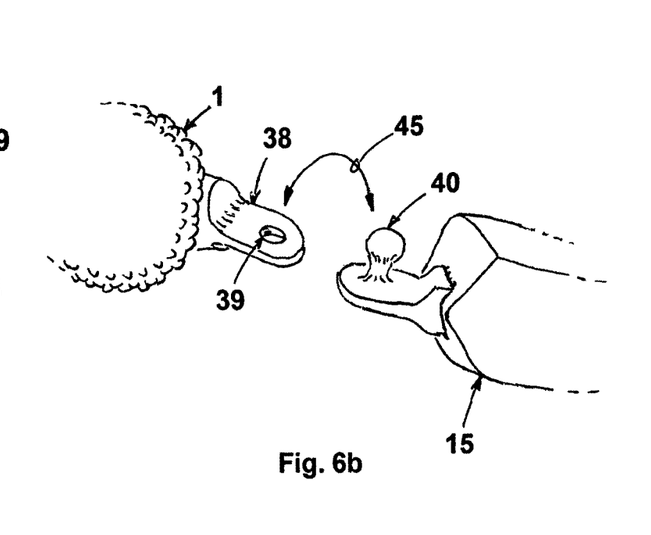

FIG. 6b shows another flexible coupling means for the first component and complementary attachment site for the second component. In this embodiment, the first component [1] includes a spine with a first end embedded in the plush material as explained previously and a second end which incorporates a tab [38] which has an aperture [39] as means for attachment. The aperture can be a hole, a slit, or a slot or any shape conducive to being forced over a peg or similar receiving feature of the receiving site [40,] or engaged by a snap hook as shown in FIG. 6a. In FIG. 6b the second component [15] offers an attachment site [40] which is a mushroom stake. A mushroom stake is a peg, dowel, or shaft with a first diameter, and a head of a second, larger diameter. Typically the head is bulbous but it can also be an oblate or a prolate spheroid, or an end disk similar the head of a nail. The aperture in the tab is of smaller diameter than the larger diameter of the mushroom stake, so is stretched over this larger diameter and relaxes around the first diameter. An arcuate, double-headed arrow [45] depicts the motion of installing the tab onto the mushroom stake. The two components can be disconnected by intentional human effort but are unlikely to come part during kinematic play by the pet.

The noisemaker contained within the plush section can be any contrivance which creates noise when crushed, but according to the preferred embodiment the device is a hollow object such as a spheroid, having an orifice acting as a whistle when the spheroid is deformed by chewing or allowed to regain its original shape. A working fluid, usually air, passes through the whistle during these changes of internal volume, and the working fluid resonates at an audible frequency. In submerged uses such as in a swimming pool, the working fluid is water and it too can achieve resonance at an audible frequency if indrawn or expelled through the whistle.

The loop of the eyelet may be of any closed contour, but in the preferred embodiment it is rectangular or substantially square. Also, in one embodiment the second component is solid material, but other embodiments such as this component being a hollow bottle or bladder, or being a shell of one material and a core of another material also reside within the scope of the invention.

In one embodiment, the first and second components when connected together resemble a show tree typically used to preserve the shape of a shoe.

Figure 7A:
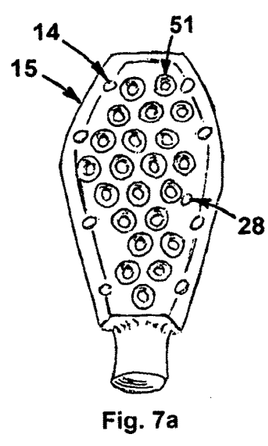
FIGS. 7a, 7b and 7c show the undersides of various embodiments of a second component of the invention.
Figure 7B:
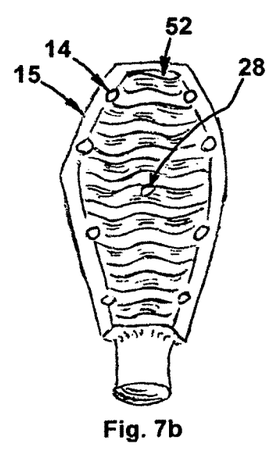
Figure 7C:
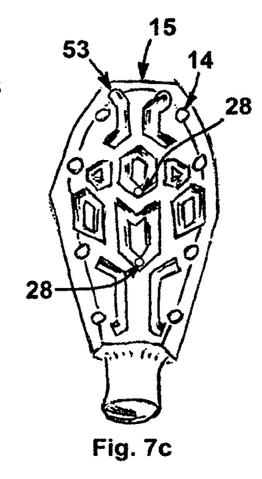

FIG. 7a, 7b, and 7c concentrate on embodiments in which the second component [15] resembles this show shape and further include tread patterns on their undersides. In each of these three figures the apertures [14] for receiving and retaining the strands of edible material or other edible morsels are shown. Also shown in these three views is at least one vent [28.] The internal contours of the internal cavity or bladder is not shown.

Tread patterns are created by grooves which can form an array of circular grooves [51] as in FIG. 7a, or wavy patterns [52] as in FIG. 7b, or other arbitrary patterns such as FIG. 7c which may resemble or be styled after tread patterns typical of hiking boots or work boots. Pasty foods such as peanut butter or pumpkin pulp can be smeared into the grooves, and firmer edible items can be force fitted or press fitted within the grooves and their contours. These edible bits serve as additional attractants for the dog, especially if they are easy to present to the dog's tongue while remaining difficult to extract from their niches.

Although the tread patterns depicted in FIGS. 7a, 7b, and 7c are shown as grooves or channels cut into the surface, tread patterns which rise up in relief from their underlying or root surface are also contemplated within the scope of the invention as are combinations of recessed and relieved or embossed features. All such features provide the utility of trapping morsels of food and edible food pastes.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A pet chew toy kit comprising
a first component comprising a plush material attached to a first end of a spine member with a second end of said spine member having an attachment means comprising a snap hook;
a second component having variable thickness and a receiving site complementary to the spine member of said first component comprising an eyelet for coupling to said attachment means,
a perimeter and a perimeter edge having variable radii of curvature along said perimeter edge, and
a plurality of apertures along at least a portion of said perimeter;
at least one third component comprising a strand of edible material laced through at least one aperture of said second component;
wherein said first component is releasably coupled to said second component.

* * * * *